United States Patent [19]

King et al.

[11] Patent Number: 4,921,000
[45] Date of Patent: May 1, 1990

[54] BREAK-AWAY COUPLING FOR HOSELINES

[76] Inventors: Frank E. King, 5 Faraday Rd., Peterlee, Co. Durham, United Kingdom; Reginald W. Lang, 34 Sandholme Dr., Burkley-in-Wharfedale, Ilkley, West Yorkshire, United Kingdom

[21] Appl. No.: 637,227
[22] PCT Filed: Nov. 30, 1983
[86] PCT No.: PCT/GB83/00312
§ 371 Date: Jul. 30, 1984
§ 102(e) Date: Jul. 30, 1984
[87] PCT Pub. No.: WO84/02171
PCT Pub. Date: Jun. 7, 1984

[30] Foreign Application Priority Data

Nov. 30, 1982 [GB] United Kingdom ............ 8234036

[51] Int. Cl.$^5$ .............................................. F16L 29/00
[52] U.S. Cl. .................................... 137/68.1; 285/4
[58] Field of Search ............... 137/68 R, 71, 614.01, 137/614.04, 514.7; 285/1, 2, 3, 4, 27; 220/89 A

[56] References Cited

U.S. PATENT DOCUMENTS

| | | |
|---|---|---|
| 1,394,072 | 10/1921 | Egbert ........................ 220/89 A |
| 2,333,423 | 11/1943 | Huffend ..................... 137/614.04 |
| 2,419,642 | 4/1947 | Henry ........................ 137/614.04 |
| 2,798,446 | 7/1957 | Eudnezze ................... 137/514.7 X |
| 2,910,080 | 10/1959 | Wright ....................... 137/68 R X |
| 2,917,077 | 12/1959 | Ziege ......................... 137/514.7 |
| 3,582,017 | 6/1971 | Zecca ......................... 285/1 |
| 3,741,521 | 6/1973 | Tatsuno ..................... 137/69 R X |
| 4,056,117 | 11/1977 | Deeks ......................... 137/68.1 |
| 4,064,889 | 12/1977 | Gayle ......................... 137/68.1 |
| 4,127,142 | 11/1978 | Snider ........................ 137/68 R |
| 4,139,222 | 2/1979 | Loland ....................... 285/27 |
| 4,351,351 | 9/1982 | Flory ......................... 137/68 R |
| 4,392,513 | 7/1983 | Parrish ...................... 137/614.01 |
| 4,424,988 | 1/1984 | Cowx ......................... 285/2 |

FOREIGN PATENT DOCUMENTS

| | | |
|---|---|---|
| 2112855 | 8/1972 | Fed. Rep. of Germany .... 137/68 R |
| 0266318 | 9/1981 | U.S.S.R. .................... 137/68 R |
| 2076917 | 12/1981 | United Kingdom ............ 137/68 R |

*Primary Examiner*—John Fox
*Attorney, Agent, or Firm*—James C. Wray

[57] ABSTRACT

A break-away coupling device for use with a hoseline or pipeline for conveying hazardous fluids. The coupling comprises coupling members (10, 11) of generally tubular form for connection at their outer ends (14, 15) to a hoseline, pipeline or other fluid-supply or fluid-delivery point, and provided at their inner ends with complementary faces (12, 13) which are held in sealing engagement by frangible connectors (18). The coupling members have valve seats (45), and valve members (30, 31) which are urged towards closing engagement with said seats but are usually being held against the springs (36) and out of engagement with the seats until the coupling members are separated on breaking of the connectors. An annular separating ram (51) is provided to apply pressure between the coupling members which will break the connectors and separate the coupling members, whereupon the valve members will seat under spring action and minimise spillage of the fluid being conveyed.

10 Claims, 1 Drawing Sheet

BREAK-AWAY COUPLING FOR HOSELINES

This invention relates to so-called break-away couplings for incorporation in hoselines, pipelines or the like, to minimise or eliminate spillage in the event of breaking of the line.

It is an object of the present invention to provide a break-away coupling which is of simple and robust construction and satisfactorily safe in operation.

According to the present invention there is provided a break-away coupling device for use with a hoseline or pipeline, comprising a first coupling member of generally tubular form for connection at its one end to a hoseline, pipeline or other fluid-supply or fluid-delivery point, and provided at its other end with a face to be held in sealing engagement with a complementary face of a second coupling member; frangible means holding said faces in sealing engagement; said first coupling member further comprising a valve seat and a valve member, and spring means urging the valve member towards closing engagement with said seat but the valve member usually being held against said spring means out of engagement with the valve seat until said coupling members are separated on breaking of the frangible means; and, separating means to apply pressure between said coupling members which will break said frangible means and separate said faces and said coupling members.

Said second coupling member may also be of generally tubular form and for connection at its one end to a fluid-supply or fluid-delivery point, and also provided at its other end with a face to be held in sealing engagement with the complementary face of the first coupling member; said second coupling member further comprising a valve seat and a valve member, spring means urging the valve member towards closing engagement with said seat but the valve member usually being held against said spring means out of engagement with the valve seat until said coupling members are separated on breaking of the frangible means.

Suitably, said separating means comprise an annular channel in the face of one of said coupling members and an annular piston or ram slidably nesting in said channel, whereby the application of fluid pressure to the base of said channel will drive the piston or ram to engage the face of said other coupling member and separate the coupling members.

Preferably, said frangible means comprise a plurality of frangible connectors each of which has one end length of spatulate shape and formed with a through opening to receive a fixing pin, a screwed length at the other end to receive a nut or the like, and an intermediate length of reduced section.

Locating sockets may be formed in the face of one of said coupling members, with locating spigots projecting from the face of the other coupling members to engage said locating sockets and resist relative rotation of the coupling members. Also, dash-pot devices may be provided to restrict the rate of closing of the valve members.

Embodiments of the invention will now be described, by way of example, with reference to the accompanying drawings in which.

Figure 1:
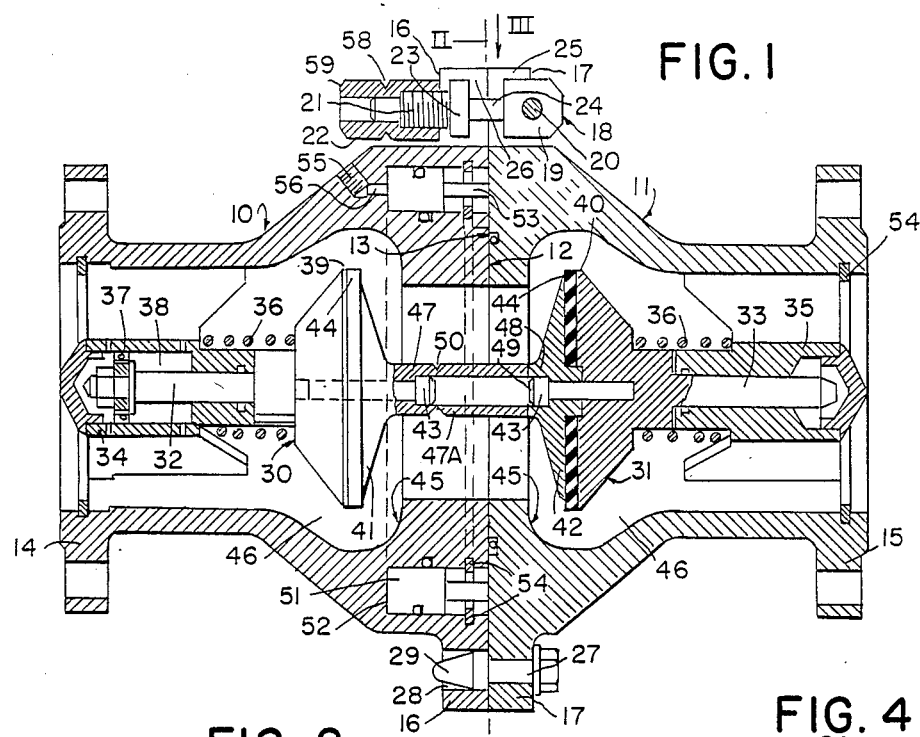
FIG. 1 is a sectional elevation showing one form of break-away coupling according to the invention, for incorporation in a hoseline.
Figure 2:
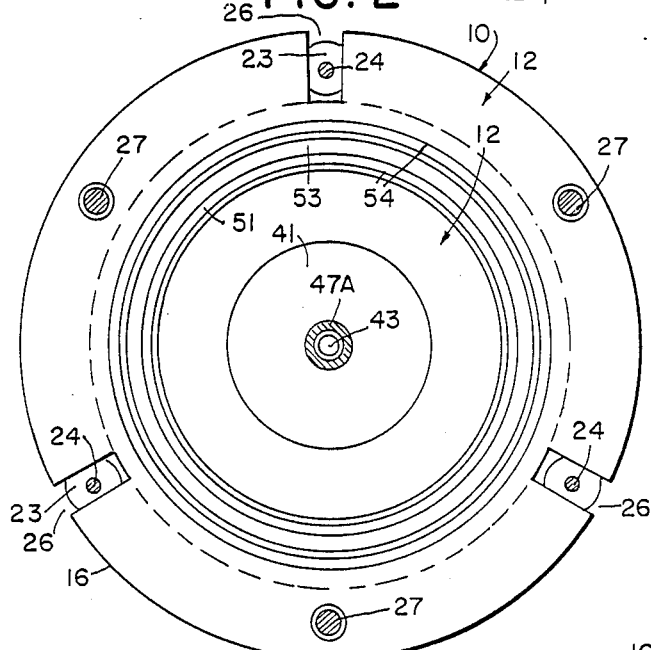
FIG. 2 is a section on the line II—II of FIG. 1.
Figure 3:
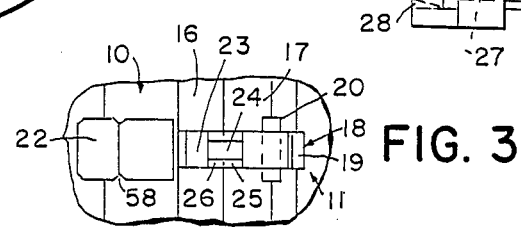
FIG. 3 is a fragmentary view in the direction of arrow III in FIG. 1.

Referring to FIGS. 1 to 3, the break-away coupling comprises two members having shaped body parts 10 and 11 of generally tubular form which are formed at their adjacent ends with cooperating sealing faces 12 and 13. At their remote ends, the parts are formed with bored flanges 14, 15 for connection to the ends of lengths of a hoseline (not shown) for the delivery of hazardous fluid such as liquified petroleum gas (LPG).

The parts 10 and 11 are also each formed with flanges 16 and 17, respectively, which are coupled together by three frangible connectors 18. As shown in FIG. 1, each connector 18 has at one end a spatulate blade 19 formed with a bore for a fixing pin 20 and, at the other end, has a screwed length 21 to receive a shear nut 22, and a locating piece 23. A frangible length 24 of reduced section extends between the blade 19 and the locating piece 23. The blades 19 enter slots 25 in the flanges of the body part 11, with the pins 20 engaging recesses in the flange 17, and the screwed lengths 21 extending beyond the flange 16 of the body part 10; the locating pieces 23 are received by slots in the flange 16 and act to prevent the lengths 24 being subjected to torque when the nuts 22 are tightened. A, preferably odd, number greater than three connectors 18 may be provided.

A series of three locating spigots 27 are bolted in bores in the flange 17 near the periphery of part 11, to enter locating sockets 28 in the coupling part 10 and resist relative rotation of the two coupling members which could rupture the connectors 18. The spigot heads 29 fit snugly in the sockets, and are formed with tapered leading ends to facilitate assembly of the coupling with the two parts 10 and 11 correctly orientated.

The body parts 10 and 11 accommodate valve members 30 and 31, which have stems 32 and 33 slidably mounted in spiders 34 and 35, respectively, and are urged towards the co-operating faces of the body parts by compression springs 36. It will be noted that the stem 32 of valve member 30 (optionally) carries a piston member 37 which is accommodated in a chamber 38 in spider 34 to provide a one-way dash-pot action, the dash-pot employing the fluid being delivered. Thus, the closing of valve member 30 is damped to prevent hydraulic hammering in the hoseline. A dash-pot device may also be provided for the valve member 31, or one or both valve-member stems may be simple sliding fits in the spiders (as is steam 33) in cases which rapid closure is required and fluid shock can be accomodated elsewhere in the line. The valve members 30 and 31 have valve heads 39 and 40 which include valve caps 41 and 42, each secured to the head by a bolt 43. Flat annular seals 44 are sandwiched one between each valve head and valve cap of the valve members, in positions to engage rim seats 45 inside the cooperating ends of the body parts 10 and 11. As can be seen from FIG. 1, the valve heads and caps are accommodated in enlarged chambers 46.

Central abutment limbs 47 and 48 extend integrally from the valve caps, and the abutting ends of the limbs may be of complementary concave and convex form (at 49) to centralise the valve members. The longer abutment limb 47 of cap 41 has a circumferential V-groove 50 to provide a weakened section allowing length 47A to be severed on separation of the coupling parts, thus avoiding the danger of projecting stems which would be liable to cause inadvertent opening of the valves.

A shaped annular piston or ram 51 nests as a sliding fit in an annular channel 52 in the face 12 of coupling part 10, and a rib 53 extends to virtual engagement with the adjacent face 13. The ram is retained in the channel by means of circlips 54 which also act as stops, and at least one socket 55 is connected through bore(s) 56 to feed high pressure fluid to the base of the channel to actuate the ram in an emergency situation.

In normal use of the break-away coupling, which is inserted at a suitable location in the hoseline, the body parts 10 and 11 are held in sealing engagement with one another by means of the connectors 18. Throughflow of fluid is permitted as the limbs 47 and 48 abut one another to hold the valve members 30 and 31 in open positions against the action of their springs 36. The large-diameter chambers 46 minimize any flow restriction which the valve heads 39, 40 might otherwise impose. It will also be noted that the ends of the valve heads are arranged almost to abut the spiders 34, 35 so that, when the body parts are coupled together, the valve members 30 and 31 are opened by substantially equal amounts. The spiders are retained in their correct positions by circlips 57 inserted in grooves in the tubular body parts 10 and 11.

In the event of the hoseline being stretched excessively, for example in the case where a road tanker or ship moves off inadvertently or in a crisis situation, with the hoseline coupled to a fixed installation, the frangible lengths 24 of the connectors 18 will fracture before rupture of the hoseline itself. On the fracture of the connectors 18 and consequent separation of the body parts 10 and 11, the valve members 30 will close promptly under the action of springs 36 possibly aided by the product pressure, so that the seals 44 engage the rim seats 45 and seal the ends of the hoseline with a minimum spillage of the fluid (such as LPG) being conveyed.

The form of the connectors and the complementary form of flanges employed, prevents the incorrect use of standard and probably higher-strength bolts; also, alternative areas of breakage are provided, in addition to the section lengths 24 which will fail in tension, by pins 20 dimensioned to fail in shear, and the blades 19 may also or alternatively be designed to fail in shear.

In a modification, to produce failure of the connectors 18 in a fire or over-heating situation, the pins 21 are formed of a material such as nylon or a lead alloy which will lose strength at predetermined high temperatures.

The shear nuts 22 are each formed with a reduced section 58 so that, when tightened, the nut head 59 will shear off at a predetermined torque whereby the three connectors will be loaded to a desired and uniform degree. Also, the removal of the heads will minimise the risk of unauthorised or accidental dismantling of the coupling as a special tool would be required to remove the remaining (leading) lengths of the shear nuts.

In an emergency situation, such as loading arm at a dockside being over-extended during fuelling of a ship, the ram 51 is operated to separate the body parts 10 and 11. In this event, high-pressure fluid, suitably nitrogen from a remote storage bottle (not shown) connected to the socket(s) 56, is fed to the channel 52 to drive the ram rib 53 against the face 13, and break the connectors 18. The fluid feed can be effected by operating an emergency button or automatically, preferably with manual override in the latter case.

Figure 4:
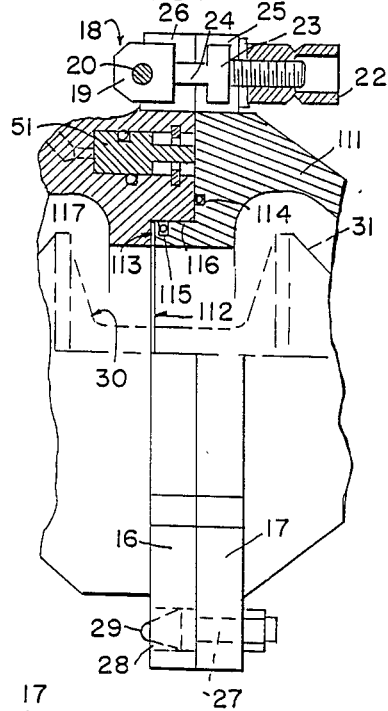
FIG. 4 is a fragmentary sectional elevation showing a modified form of coupling according to the invention.

In the modified form of coupling shown in FIG. 4, the parts 110 and 111 have female and male cooperating faces 112 and 113. In addition to sealing ring 114, a sealing ring 115 is provided in an annular recess in cylindrical section 116 of the face 113. In this embodiment, hydraulic pressure acts to maintain at least the seal 115 in fluid-tight contact with the cylindrical sections 116 and 117, this contact also being maintained during the initial period of a separating operation to minimise fluid loss. This arrangement is particularly useful for low-temperature applications where an O-ring seal (114) between flat faces may fail due to deterioration of the seal material in the rectangular-section recesses.

The FIG. 4 construction also shows the frangible connectors 18 in a position which is reverse to that shown in FIGS. 1 to 3, but corresponding references donate corresponding parts. The spigots 27 and sockets 28 are as shown in the position of FIGS. 1 to 3.

In a further modification (not shown), the form of ram (51) may be modified. For example, one or more individual cylindrical pistons, or an explosive device, may be employed.

In another embodiment of the invention, only one of the body parts 10 or 110 is as illustrated, the other part being connected to a suitable open coupling flange; this form of coupling may be effectively oneended, with only one of the parts being provided with a poppet valve (30 or 31).

As illustrated, the coupling is for incorporation in a hoseline, but one end part of the coupling may be connected to a fixed supply or delivery point. In a further application, the coupling is incorporated in a metal or other more-or-less rigid pipeline which may be subjected to line-shock or surge pressures, the connectors being designed to fracture when the pressure exceeds a predetermined value.

We claim:

1. A break-away coupling device for use with a hoseline or pipeline, comprising a first coupling member of generally tubular form for connection at its one end to a length of hoseline, pipeline or other fluid-supply or fluid-delivery point, and provided at its other end with a face to be held in sealing engagement with a complementary face of a second coupling member; frangible means holding said faces in sealing engagement; said first coupling member further comprising a valve seat and a valve member, and spring means urging the valve member towards closing engagement with said seat but the valve member usually being held against said spring means out of engagement with the valve seat until said coupling members are separated on breaking of the frangible means; and, separating means to apply pressure between said coupling members which will break said frangible means and separate said faces and said coupling members said separating means comprising an annular channel in the face of one of said coupling members and an annular piston slidably nesting in said channel, whereby the application of fluid pressure to the base of said channel will drive the piston to engage the face of said other coupling member and separate the coupling members.

2. A break-away coupling device as claimed in claim 1, in which said second coupling member is also of generally tubular form and is for connection at its one end to a hoseline, pipeline or other fluid-supply or fluid-delivery point, and is also provided at its other end with a face to be held in sealing engagement with the complementary face of the first coupling member; said second coupling member further comprising a valve seat and a valve member, spring means urging the valve member towards closing engagement with said seat but the valve member usually being held against said spring means out of engagement with the valve seat until said coupling members are separated on breaking of the frangible means.

3. A break-away coupling device as claimed in claim 1 in which said frangible means comprise a plurality of frangible connectors each of which has one end length of spatulate shape and formed with a through opening to receive a fixing pin, a screwed length at the other end to receive a nut or the like, and an intermediate length of reduced section.

4. A break-away coupling device as claimed in claim 1 in which at least one locating socket is formed in the face of one of said coupling members and at least one locating spigot projects from the face of the other coupling members to engage said locating socket and resist relative rotation of the coupling members.

5. A break-away coupling device for use with a hoseline or pipeline, comprising a first coupling member of generally tubular form for connection at its one end to a length of hoseline, pipeline or other fluid-supply or fluid-delivery point, and provided at its other end with a face to be held in sealing engagement with a complementary face of a second coupling member; frangible means holding said faces in sealing engagement; said first coupling member further comprising a valve seat, a valve member, and spring means urging the valve member towards closing engagement with said seat but the valve member usually being held against said spring means out of engagement with the valve seat until said coupling members are separated on breaking of the frangible means, and, separating means to apply pressure between said coupling members which will break said frangible means and separate said faces and said coupling members in which said separating means comprise an annular channel in the face of one of said coupling members and an annular piston slidably nesting in said channel, whereby the application of fluid pressure to the base of said channel will drive the piston to engage the face of said other coupling member and separate the coupling members.

6. A break-away coupling device as claimed in claim 5, in which a dash-pot device is incorporated in said valve member to restrict the rate of closing of that valve member.

7. A break-away coupling device as claimed in claim 6, in which said dash-pot device employs the fluid being supplied or delivered.

8. A break-away coupling device as claimed in claim 5 or 6, in which said valve member is provided with a projecting abutment limb which can be severed on separation of the coupling members.

9. A break-away coupling device as claimed in claim 8, in which the distal end of said abutment limb is so shaped as to act to centralise the valve member.

10. A break-away coupling device as claimed in claim 5 or 6, in which the complementary faces of said coupling members are of male and female form, respectively, and inner and outer sealing rings are provided in recesses in the male face.

* * * * *